United States Patent
Hwang (10) Patent No.: US 7,333,579 B2
(45) Date of Patent: Feb. 19, 2008

(54) ROBUST SYMBOL TIMING RECOVERY CIRCUIT FOR TELEPHONE LINE MODEM

(75) Inventor: Sung-hyun Hwang, Suwon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 789 days.

(21) Appl. No.: 10/354,646

(22) Filed: Jan. 30, 2003

(65) Prior Publication Data

US 2004/0047463 A1 Mar. 11, 2004

(30) Foreign Application Priority Data

Sep. 9, 2002 (KR) ............. 10-2002-0054256

(51) Int. Cl.
*H04L 7/00* (2006.01)

(52) U.S. Cl. ............. 375/355; 375/371; 375/222

(58) Field of Classification Search ............. 375/222, 375/219, 340, 355, 371
See application file for complete search history.

(56) References Cited

U.S. PATENT DOCUMENTS

| | | | | |
|---|---|---|---|---|
| 4,215,348 A | * | 7/1980 | Cordaro et al. | 370/324 |
| 4,544,927 A | * | 10/1985 | Kurth et al. | 342/373 |
| 4,630,282 A | * | 12/1986 | Landers et al. | 375/132 |
| 5,126,946 A | * | 6/1992 | Ko | 700/66 |
| 5,504,726 A | * | 4/1996 | Semba | 369/44.28 |
| 5,625,652 A | * | 4/1997 | Petranovich | 375/355 |
| 5,793,822 A | * | 8/1998 | Anderson et al. | 375/371 |
| 5,909,470 A | * | 6/1999 | Barratt et al. | 375/324 |
| 6,169,742 B1 | * | 1/2001 | Chow et al. | 370/402 |
| 6,272,138 B1 | * | 8/2001 | Weon | 370/395.62 |
| 6,337,657 B1 | * | 1/2002 | Zhodzishsky et al. | 342/357.02 |
| 6,356,862 B2 | * | 3/2002 | Bailey | 703/16 |
| 6,377,683 B1 | * | 4/2002 | Dobson et al. | 379/406.12 |
| 6,400,715 B1 | * | 6/2002 | Beaudoin et al. | 370/392 |
| 6,640,194 B2 | * | 10/2003 | Little et al. | 702/74 |
| 6,768,780 B1 | * | 7/2004 | Lakkis et al. | 375/355 |
| 6,791,995 B1 | * | 9/2004 | Azenkot et al. | 370/436 |
| 7,135,903 B2 | * | 11/2006 | Kizer et al. | 327/159 |
| 2002/0012343 A1 | * | 1/2002 | Holloway et al. | 370/389 |
| 2002/0031197 A1 | * | 3/2002 | Yedid | 375/355 |
| 2002/0057713 A1 | * | 5/2002 | Bagchi et al. | 370/468 |
| 2002/0061082 A1 | * | 5/2002 | Balakrishnan et al. | 375/355 |
| 2002/0094048 A1 | * | 7/2002 | Simmons et al. | 375/362 |
| 2002/0103618 A1 | * | 8/2002 | Schleifer et al. | 702/176 |
| 2002/0181622 A1 | * | 12/2002 | Boutros et al. | 375/343 |

(Continued)

*Primary Examiner*—Phuong Phu
(74) *Attorney, Agent, or Firm*—F. Chau & Assoc., LLC (57) ABSTRACT

A robust symbol timing recovery circuit for a telephone line modem is provided. The symbol timing recovery circuit comprises a timing estimator and an interpolator. The timing estimator, which performs an operation on input samples and estimates a timing offset of a received symbol, outputs a timing offset estimated for each symbol for a first window interval, and thereafter outputs a timing offset estimated in an immediately previous window interval for the current window interval. The interpolator, which performs interpolation using the input samples, comprises a plurality of shift registers which are serially connected and output the input samples in units of a predetermined plural number of input samples, by sequentially delaying for an input sample 15 period and outputting the input samples. Since the symbol timing recovery circuit is not sensitive to clock instability and employs a stable timing offset estimating method, symbol timing can be recovered stably and reliably.

19 Claims, 9 Drawing Sheets

U.S. PATENT DOCUMENTS

| | | | |
|---|---|---|---|
| 2002/0186677 A1* | 12/2002 | Leung | 370/342 |
| 2003/0016169 A1* | 1/2003 | Jandrell | 342/357.12 |
| 2003/0043766 A1* | 3/2003 | McDonough et al. | 370/335 |
| 2003/0048500 A1* | 3/2003 | Fala et al. | 359/110 |
| 2003/0141914 A1* | 7/2003 | Buchwald et al. | 327/248 |
| 2003/0174690 A1* | 9/2003 | Benveniste | 370/350 |
| 2003/0215002 A1* | 11/2003 | Gorday et al. | 375/147 |
| 2004/0047319 A1* | 3/2004 | Elg | 370/338 |
| 2004/0057542 A1* | 3/2004 | Knapp et al. | 375/355 |
| 2004/0058653 A1* | 3/2004 | Dent | 455/69 |
| 2005/0031097 A1* | 2/2005 | Rabenko et al. | 379/93.31 |

* cited by examiner

| SAMPLES | TIMING OFFSET | TIMING OFFSET× 4 | INTEGER TIMING OFFSET | FRACTIONAL TIMING OFFSET | SAMPLING POINT |
|---|---|---|---|---|---|
| 0 | 0 | 0 | 0 | 0.0 | 2 |
| 1 | 0.0625 | 0.25 | 0 | 0.25 | 2 |
| 2 | 0.125 | 0.5 | 0 | 0.5 | 2 |
| 3 | 0.1875 | 0.75 | 0 | 0.75 | 2 |
| 4 | 0.25 | 1.0 | 1 | 0.0 | 3 |
| 5 | 0.3125 | 1.25 | 1 | 0.25 | 3 |
| 6 | 0.375 | 1.5 | 1 | 0.5 | 3 |
| 7 | 0.4375 | 1.75 | 1 | 0.75 | 3 |
| 8 | 0.5 | 2.0 | 2 | 0.0 | 0 |
| 9 | 0.5625 | 2.25 | 2 | 0.25 | 0 |
| 10 | 0.625 | 2.5 | 2 | 0.5 | 0 |
| 11 | 0.6875 | 2.75 | 2 | 0.75 | 0 |
| 12 | 0.75 | 3.0 | 3 | 0.0 | 1 |
| 13 | 0.8125 | 3.25 | 3 | 0.25 | 1 |
| 14 | 0.875 | 3.5 | 3 | 0.5 | 1 |
| 15 | 0.9375 | 3.75 | 3 | 0.75 | 1 |

FIG. 9

ROBUST SYMBOL TIMING RECOVERY CIRCUIT FOR TELEPHONE LINE MODEM

CROSS-REFERENCE TO RELATED APPLICATION

This application claims priority to an application entitled "ROBUST SYMBOL TIMING RECOVERY CIRCUIT FOR TELEPHONE LINE MODEM" filed in the Korean Industrial Property Office on Sep. 9, 2002 and assigned Application Serial No. 2002-54256, the contents of which are hereby incorporated by reference.

BACKGROUND OF THE INVENTION

1. Field of the Invention

The present invention relates to the field of telephone line modems, and more particularly, to a symbol timing recovery circuit in a telephone line modem receiver.

2. Description of the Related Art

With increasing attention being paid to home networking technology in recent years, development efforts have been proceeding in a variety of ways. One target of recent efforts, which is expected to be in high demand in the future, is a method of using telephone lines to implement home networking.

A symbol synchronization algorithm is a core technological element of a telephone line modem. Symbol synchronization refers to recovery of the timing of a symbol, that is, determination of an optimal sampling time when sampling a received analog signal in order to convert it into a digital signal.

Figure 1:
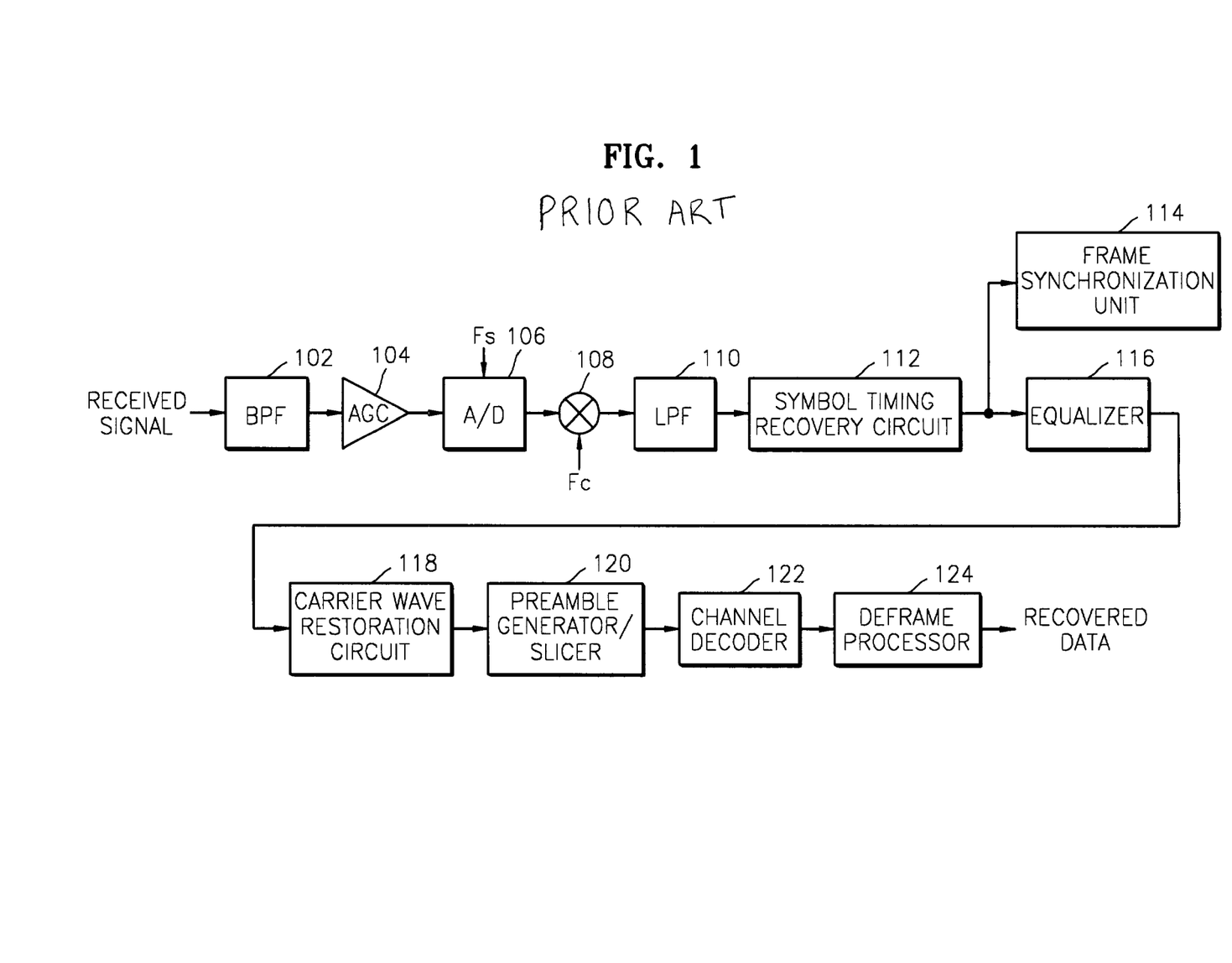
FIG. 1 is a schematic block diagram showing a conventional receiver of an ordinary telephone line modem.

FIG. 1 is a schematic block diagram showing a receiver of a conventional telephone line modem. In general, a received signal, which is input to the receiver of a telephone line modem, is an analog signal and is sent through a band pass filter (BPF) 102. Next, a gain of the signal is adjusted in an automatic gain controller (AGC) 104. An output signal of the AGC 104 is converted into a digital signal, by being sampled with a sampling frequency (Fs) in an analog-to-digital converter (A/D) 106. The output digital signal is then converted into a baseband signal by multiplication by a signal having a central frequency (Fc) in a mixer 108. The baseband signal is subsequently filtered in a low pass filter (LPF) 110, and then sent through a symbol timing recovery circuit 112, a frame synchronization unit 114, an equalizer 116, a carrier wave restoration circuit 118, a preamble generator/slicer 120, a channel decoder 122, and a deframe processor 124, and then is finally restored into information data.

Since the functions and operations of the elements of a conventional telephone line modem receiver are well-known to those skilled in the art, detailed explanation will be omitted. Among the elements of a telephone line modem, the symbol timing recovery circuit is of particular focus in the present invention.

Several algorithms for symbol synchronization have already been introduced, and symbol timing recovery circuits of the prior art simply apply these known symbol synchronization algorithms to a telephone line modem. However, symbol timing recovery circuits according to the prior art are vulnerable to clock instability and thus lack stability in symbol timing recovery. Since there is very low probability of a frequency offset occurring in a telephone line channel, clock instability occurring in an oscillator of a transmission/reception terminal accounts for the vast majority of the frequency offset. Therefore, a timing recovery circuit which is insensitive to clock instability and can stably estimate a timing offset is needed.

SUMMARY OF THE INVENTION

In accordance with the present invention, a timing estimator which can stably estimate a timing offset for a telephone line modem is provided. Additionally, an interpolator is provided which can interpolate a received signal without dropping or reiteration, by overcoming clock instability. Furthermore, a timing recovery circuit for a telephone line modem which comprises the timing estimator and the interpolator is provided.

According to an aspect of the present invention, there is provided a symbol timing estimating circuit which estimates a symbol timing offset in a telephone line modem receiver, the symbol timing estimating circuit comprising a timing offset estimating unit which performs an operation on a received sample signal, estimates a timing offset, and outputs the estimated timing offset, wherein the timing offset estimating unit, in response to a control signal, estimates the timing offset in units of a predetermined window size, outputs a timing offset estimated for each symbol for a first window interval, and thereafter outputs a timing offset estimated in an immediately previous window interval for a current window interval, and a control signal generation unit which generates the control signal for, controlling the operation of the timing offset estimating unit in response to a carrier sense signal.

It is preferable that the timing offset estimating unit comprises an operator which calculates and outputs a square of the received sample signal, a mean estimator which calculates a mean of the output of the operator in units of the window size, in response to a reset signal, and a memory unit which maintains the mean value output from the mean estimator in response to a hold signal.

It is preferable that the control signal generation unit begins counting from a time when the carrier sense signal is received, activates a reset signal whenever the count value is a multiple of the window size, and activates a hold signal when the count value is greater than the window size and the reset signal is inactivated.

According to another aspect of the present invention, there is provided an interpolator circuit which performs interpolation using input samples in a telephone line modem receiver, the interpolator circuit comprising a plurality of shift registers which are serially connected and output the input samples in parallel in units of a predetermined plural number of input samples, by sequentially delaying for an input sample period and then outputting the input samples, a controller which selects four adjacent samples in a predetermined location among the plurality of input samples in response to an integer timing offset, and an interpolator which performs interpolation using the input samples selected by the controller and outputs output samples, in response to a fractional timing offset.

It is preferable that the number of input samples for each symbol is 4.

It is preferable that the controller selects 4 adjacent input samples immediately preceding the current location by a distance of 4 samples when the integer timing offset varies from 1 to 2, and selects 4 adjacent input samples immediately succeeding the current location by a distance of 4 samples when the integer timing offset varies from 2 to 1.

According to another aspect of the present invention, there is provided a symbol timing recovery circuit which recovers a symbol timing in a telephone line modem receiver, the symbol timing recovery circuit comprising a timing estimator which performs an operation on input samples and estimates a timing offset of a received symbol, wherein the timing estimator outputs a timing offset estimated for each symbol for a first window interval, and thereafter outputs a timing offset estimated in an immediately previous window interval for a current window interval, and an interpolator which performs interpolation using the input samples. Here, the interpolator comprises a plurality of shift registers which are serially connected, and output the input samples in units of a predetermined plural number of input samples, by sequentially delaying for an input sample period and then outputting the input samples, a control unit which selects four adjacent samples in a predetermined location among the plurality of input samples in response to an integer timing offset, and an interpolation unit which performs interpolation using the input samples selected by the controller and outputs output samples, in response to a fractional timing offset.

It is preferable that the timing estimator comprises a timing offset estimating unit which estimates the timing offset in units of a predetermined window size in response to a control signal, and a control signal generation unit which generates the control signal for controlling the operation of the timing offset estimating unit in response to a carrier sense signal.

BRIEF DESCRIPTION OF THE DRAWINGS

The above aspects and advantages of the present invention will become more apparent by describing in detail preferred embodiments thereof with reference to the attached drawings in which.

DESCRIPTION OF THE PREFERRED EMBODIMENTS

Figure 2:
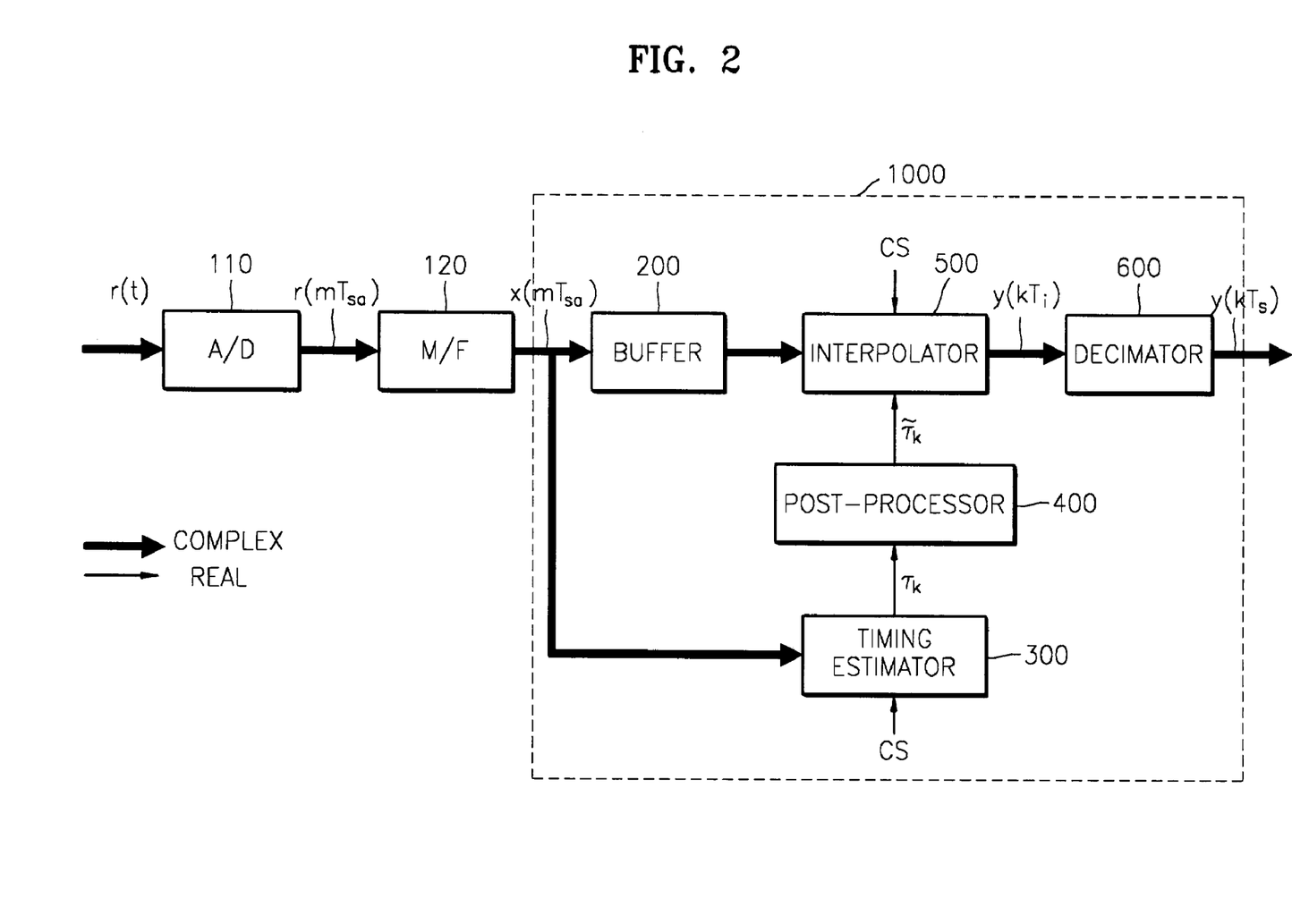
FIG. 2 is a schematic block diagram of a symbol timing recovery circuit according to a preferred embodiment of the present invention.

FIG. 2 is a schematic block diagram of a symbol timing recovery circuit 1000 according to a preferred embodiment of the present invention. Referring to FIG. 2, the symbol timing recovery circuit 1000 is designed based on a feedforward method. The reason for employing the feedforward method will now be explained.

Firstly, 10 Mbps-level telephone line home networking systems, including Home Phoneline Networking Alliance (HomePNA) 2.0, use burst mode transmission for which it is necessary to perform stable and fast acquisition during a given preamble. Accordingly, a type of block demodulation using a buffer is used so that succeeding synchronization parts bear less burden of acquisition time. Secondly, since initial synchronization can be performed faster by the feedforward method than by a feedback symbol synchronization method, the feedforward method is usually preferred for burst mode receivers. Thirdly, the feedforward symbol synchronization method does not need a loop filter and voltage controlled oscillator (VCO) used in a feedback method and thus the hardware structure required to perform the feedforward method is simple and can be implemented at a lower cost. Lastly, when a nondecision-directed (NDD) method that does not use a preamble is employed, the feedforward method has the advantage of being insensitive to a predetermined preamble pattern, compared to an ordinary zero point detection method.

With continued reference to FIG. 2, the symbol timing recovery circuit 1000 comprises a buffer 200, a timing estimator 300, a post-processor 400, an interpolator 500, and a decimator 600.

The buffer 200 is a memory which stores a symbol during estimation of a timing offset. A received signal (r(t)) is converted into a digital signal ($r(mT_{sa})$) in an analog-to-digital (A/D) converter 110 and is input to the buffer 200 through a matching filter (M/F) 120.

The timing estimator 300 uses a nondecision-directed (NDD) discrete Fourier transform (DFT) timing estimation method. This method was suggested by Oerder and Meyr in "Digital Filter and Square Timing Recovery", IEEE Trans. Commun., May 1998, the contents of which are incorporated by reference.

The timing estimator 300 comprises a timing offset estimating unit 310 which estimates a timing offset, and a control signal generation unit 350 which generates a control signal for controlling the operation of the timing offset estimating unit 310. The detailed structures and operations of the timing offset estimating unit 310 and the control signal generation unit 350 will be explained below with reference to FIGS. 3 and 5.

An equation for estimating a timing offset using the NDD DFT timing estimation method is:

$$\tau_k = \frac{1}{2\pi}\arctan\left[\sum_{m=0}^{LM-1} \frac{X(mT_{sa})X^*(mT_{sa})\sin(2\pi m/M)}{X(mT_{sa})X^*(mT_{sa})\cos(2\pi m/M)}\right] \quad (1)$$

where $\tau_k$ denotes a timing offset, $X(mT_{sa})$ denotes an input sample, $X^*(mT_{sa})$ denotes the conjugate of $X(mT_{sa})$, M denotes the number of samples for a symbol, and L denotes the size of a window estimating a timing offset.

If M=4 is used, the operation is performed with 4 samples for each symbol. Accordingly, when m=0, 1, 2, 3, . . . , the cosine value is 1, 0, −1, 0, . . . and the sine value is 0, 1, 0, −1, . . . , respectively. Therefore, the implementation of Equation 1 is simple.

Figure 3:
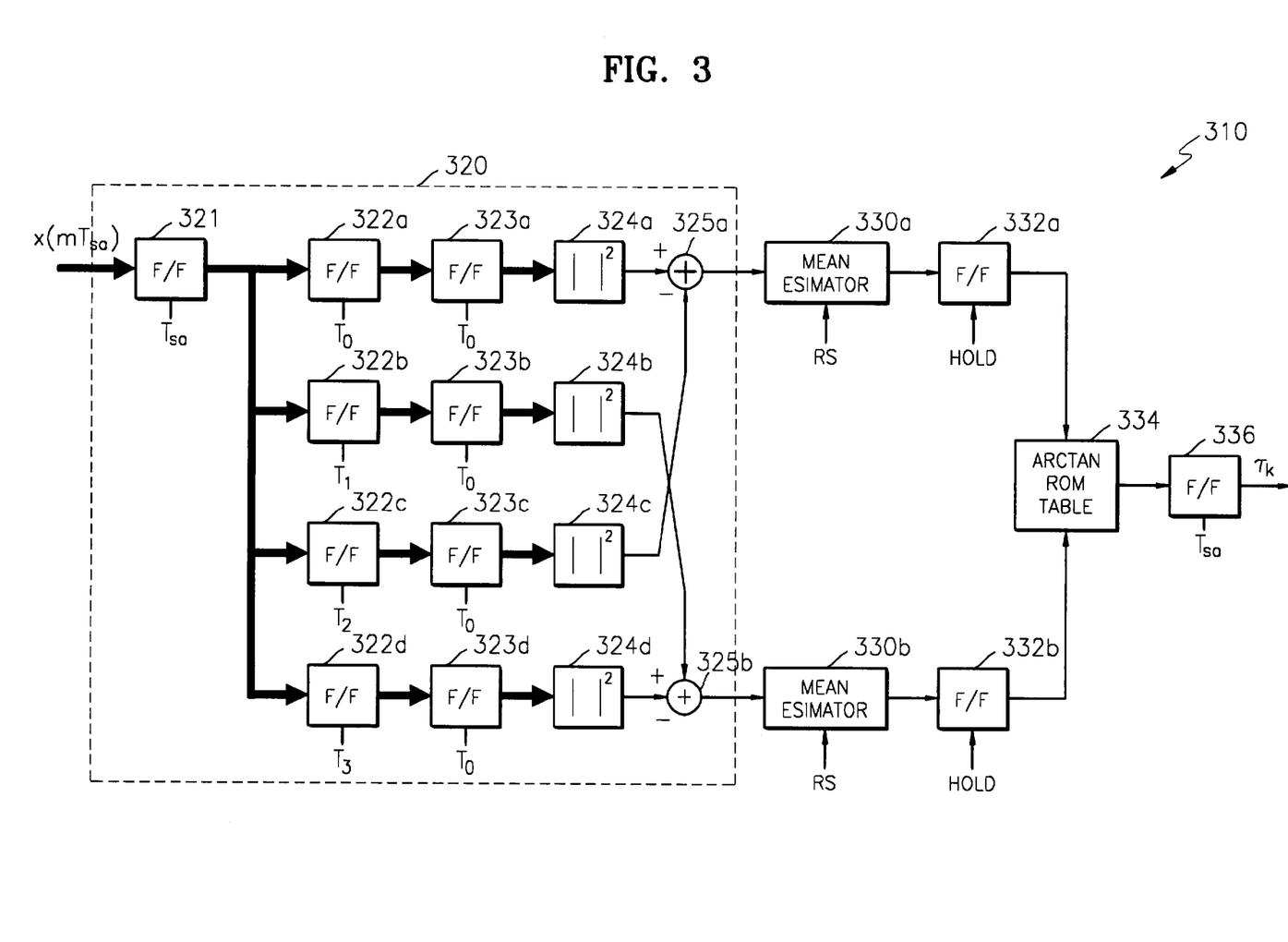
FIG. 3 is a detailed diagram of the structure of a timing offset estimating unit of a timing estimator shown in FIG. 2.

FIG. 3 is a detailed diagram of the structure of the timing offset estimating unit 310 of the timing estimator 300 shown in FIG. 2. Referring to FIG. 3, the timing offset estimating unit 310 is a circuit which implements the NDD DFT timing estimation method employing Equation 1. To minimize signal distortion, the timing offset estimating unit 310 outputs a timing offset estimated for each symbol during the first window interval, and during each successive window interval, outputs a timing offset that is estimated in the immediately previous window interval.

The timing offset estimating unit 310 comprises an operator 320 which performs operations on the input sample X($mT_{sa}$), mean estimators 330a and 330b which calculate mean values of outputs of the operator 320 in units of a predetermined window size in response to a reset signal (RS), memory units 332a and 332b which maintain the mean value output from the mean estimators 330a and 330b in response to a hold signal (HOLD), and a ROM table 334.

Four input samples X($mT_{sa}$) that are sampled from one symbol are input to four squaring units 324a through 324d, respectively, and the squares (X($mT_{sa}$) X*($mT_{sa}$)) of the input samples are obtained. A first adder 325a subtracts the output of the third squaring unit 324c from the output of the first squaring unit 324a. Accordingly, the output of the first adder 325a is the denominator of Equation 1 for one symbol interval. A second adder 325b subtracts the output of the second squaring unit 324b from the output of the fourth squaring unit 324d. Accordingly, the output of the second adder 325b is the numerator of Equation 1 for one symbol interval.

The first mean estimator 330a obtains the mean value of the outputs of the first adder 325a during a window size, in response to a reset signal (RS), and the second mean estimator 330b obtains the mean value of the outputs of the second adder 325b during a window size, in response to a reset signal (RS). The memory units 332a and 332b are flip-flops and maintain the mean values output from the mean estimators 330a and 330b, in response to a hold signal (HOLD). That is, if the hold signal (HOLD) is in a first logic level (here, this is a "high" logic level), the memory units 332a and 332b maintain the previous signals, and if the hold signal (HOLD) is in a second logic level (here, this is a "low" logic level), the memory units 332a and 332b update the values with the mean values output from the mean estimators 330a and 330b.

The ROM table 334 is a memory storing arctan values in a table and outputs an arctan value according to the two values output from the memory units 332a and 332b, as a timing offset ($\tau_k$).

It is preferable that the timing offset estimating unit 310 further comprises a flip-flop 336 for outputting the timing offset ($\tau_k$) with a sample period (Tsa).

Figure 4:
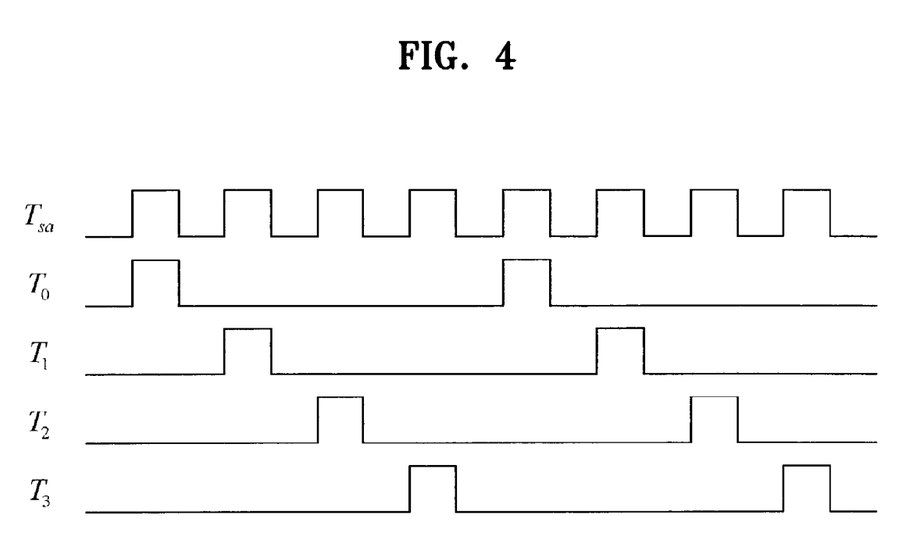
FIG. 4 is a diagram showing clock signals that are input to the timing offset estimating unit shown in FIG. 3.

FIG. 4 is a diagram showing clock signals that are input to the timing offset estimating unit 310 shown in FIG. 3. Clock signals $T_{sa}$ and $T_0$~$T_3$ are signals for controlling the flip-flops 321, 322a~322d and 336 of the timing offset estimating unit 310.

Referring to FIGS. 3 and 4, the first flip-flop 321 of the operator 320 receives and outputs input samples (X($mT_{sa}$)) in response to the first clock signal ($T_{sa}$) having the sample period. The second through fifth flip-flops 322a through 322d respond to the second through fifth clock signals ($T_0$~$T_3$), respectively. As shown in FIG. 4, the second through fifth clocks signals ($T_0$~$T_3$) have a period of the sample cycle (Tsa) * 4, and are sequentially switched to a "high" logic level every sample cycle, and after a half cycle, each "high" logic level signal is switched back to a "low" logic level.

Therefore, the second flip-flop 322a receives and outputs the first input sample among the four input samples (X($mT_{sa}$)) for one symbol, the third flip-flop 322b receives and outputs the second input sample among the four input samples (X($mT_{sa}$)) for one symbol, the fourth flip-flop 322c receives and outputs the third input sample among the four input samples (X($mT_{sa}$)) for one symbol, and the fifth flip-flop 322d receives and outputs the fourth input sample among the four input samples (X($mT_{sa}$)) for one symbol. Since the sixth through ninth flip-flops 323a through 323d all respond to the first clock signal ($T_{sa}$), the flip-flops 323a through 323d output respective input samples at the same time. Accordingly, operations on each of the four samples (X($mT_{sa}$)) input for one symbol are performed in parallel.

Figure 5:
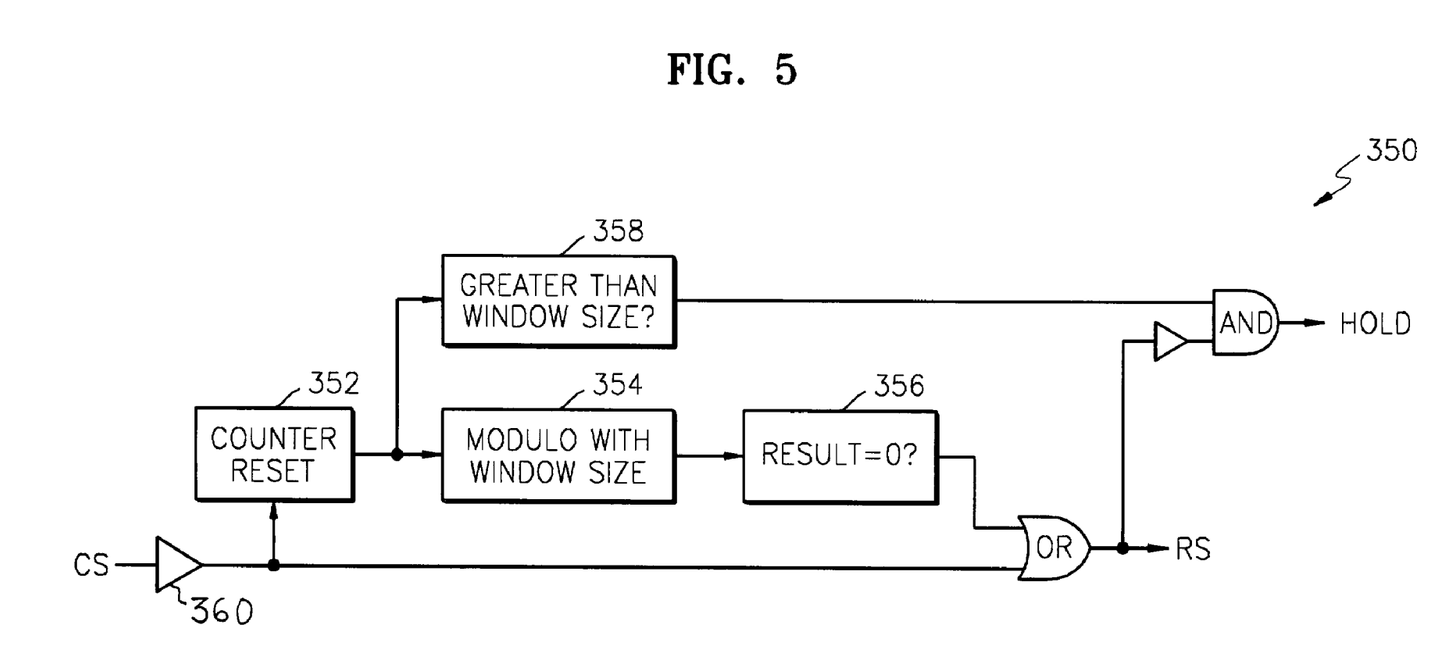
FIG. 5 is a diagram showing a control signal generation unit of the timing estimator shown in FIG. 2.

FIG. 5 is a block diagram showing the control signal generation unit 350 of the timing estimator 300 shown in FIG. 2. Referring to FIG. 5, the control signal generation unit 350 is a block for generating control signals for controlling the timing offset estimating unit 310, e.g., the reset signal (RS) and the hold signal (HOLD), and comprises a counter 352, a modulo operation unit 354, a first decision unit 356, a second decision unit 358, and logic operation units (AND, OR).

The counter 352 begins counting from the time when a carrier sense signal (CS) is activated, and outputs an updated count value at each symbol cycle. The carrier sense signal (CS) indicates whether or not there is a received signal and is activated when the level of a received signal is greater than a predetermined threshold. The modulo operation unit 354 outputs 0 whenever the count value output from the counter 352 is a multiple of the window size. The first decision unit 356 generates 1 as the result of decision whenever the output of the modulo operation unit 354 is 0. The reset signal (RS) is generated by an OR operation of the decision result of the first decision unit 356 and the inverse signal of the carrier sense signal (CS) as produced by inverter 360. Accordingly, after the carrier sense signal (CS) is activated, the reset signal (RS) is activated whenever the count value output from the counter 352 is a multiple of the window size.

The second decision unit 358 generates a "high" logic level signal ('1') when the count value output from the counter 352 is greater than the size of the window. Accordingly, the control signal generation unit 350 generates a hold signal (HOLD) which is activated when the count value output from the counter 352 is greater than the window size and the reset signal (RS) is inactivated (when RS=0).

Referring again to FIG. 3, since the mean estimators 330a and 330b of the timing offset estimating unit are reset in response to the reset signal (RS), the mean estimators 330a and 330b eventually calculate the mean values of the outputs of the operator 320 in units of the window size. The memory units 332a and 332b storing the mean values are controlled by the hold signal (HOLD), which is activated when the reset signal (RS) is inactivated after the first window. Therefore, as described above, a timing offset estimated for each symbol is output during the first window interval, and a timing offset estimated in the immediately previous window interval is output during every window interval thereafter.

Referring back to FIG. 2, the post-processor 400 filters the timing offset ($\tau_k$). When a normalized timing offset is 0.5, due to the arctan characteristic of the timing estimator, oscillation may occur with alternating estimations of +0.5 and −0.5. In this case, since an interpolator performs repetitive interpolation of +2 samples and −2 samples, oscillation may occur without accurate demodulation. Therefore, a device which can output a consistent timing estimate value is needed and the post-processor 400 plays this role. The normalized timing offset is obtained by dividing a timing offset that is expressed in units of time, by the symbol period (Tsa). Herein, the timing offset is assumed to be normalized.

Figure 6:
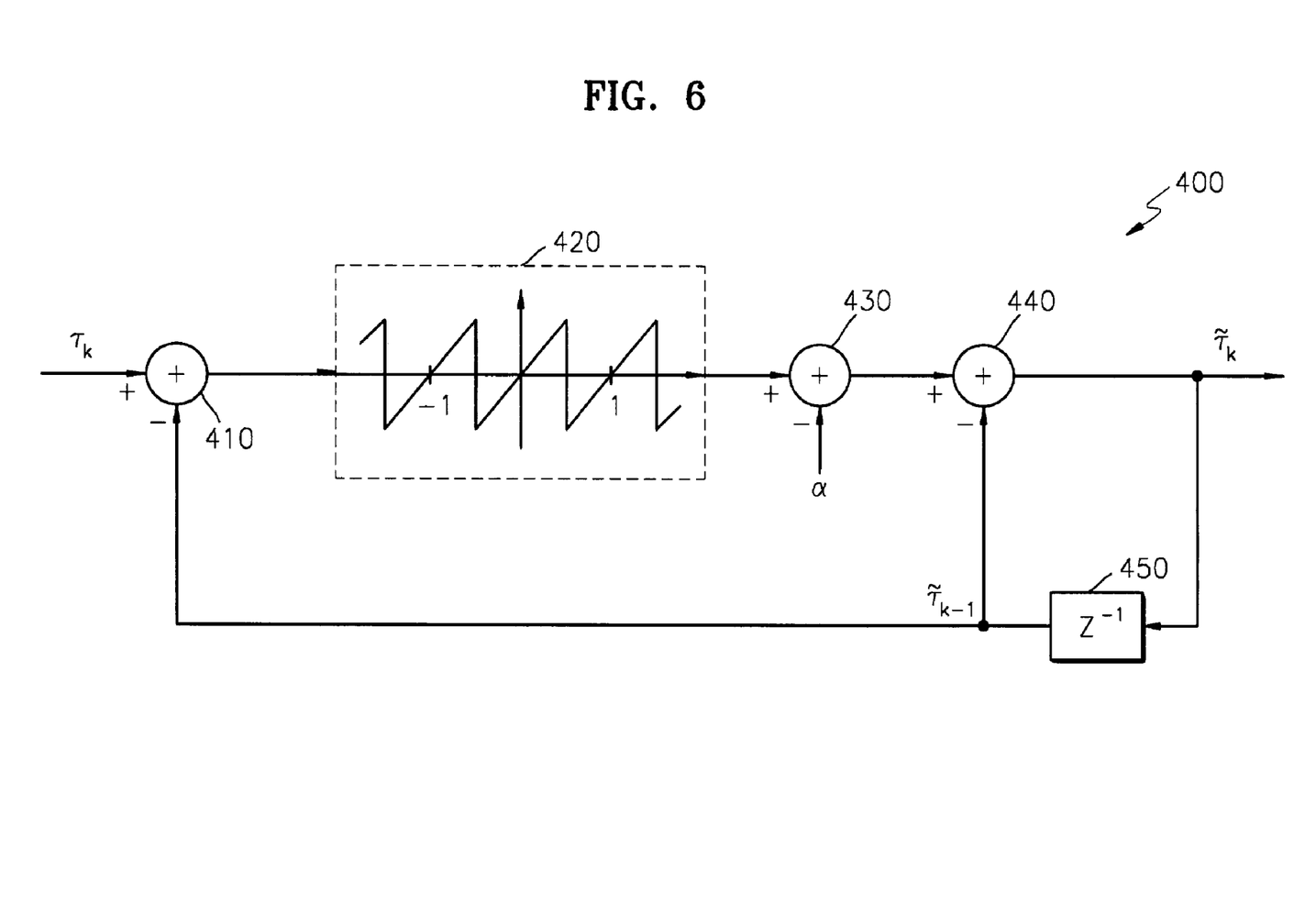
FIG. 6 is a diagram showing a preferred embodiment of a post-processor shown in FIG. 2.

FIG. 6 is a diagram showing a preferred embodiment of the post-processor 400 shown in FIG. 2. The post-processor 400 may comprise a first adder 410, a filter 420, a multiplier 430, a second adder 440, and a delay 450. The output of the post-processor 400 is referred to as a filtered timing offset ($\bar{\tau}_k$). The post-processor 400 shown in FIG. 6 subtracts the previous filtered timing offset value ($\tilde{\tau}_{k-1}$) from the timing offset ($\tau_k$), filters the result with a value within a predetermined range, multiplies the result by a predetermined coefficient ($\alpha$), and adds the previous filtered timing offset value ($\tilde{\tau}_{k-1}$) back to the result. By doing so, the filtered timing offset ($\tilde{\tau}_k$) is obtained.

Figure 7:
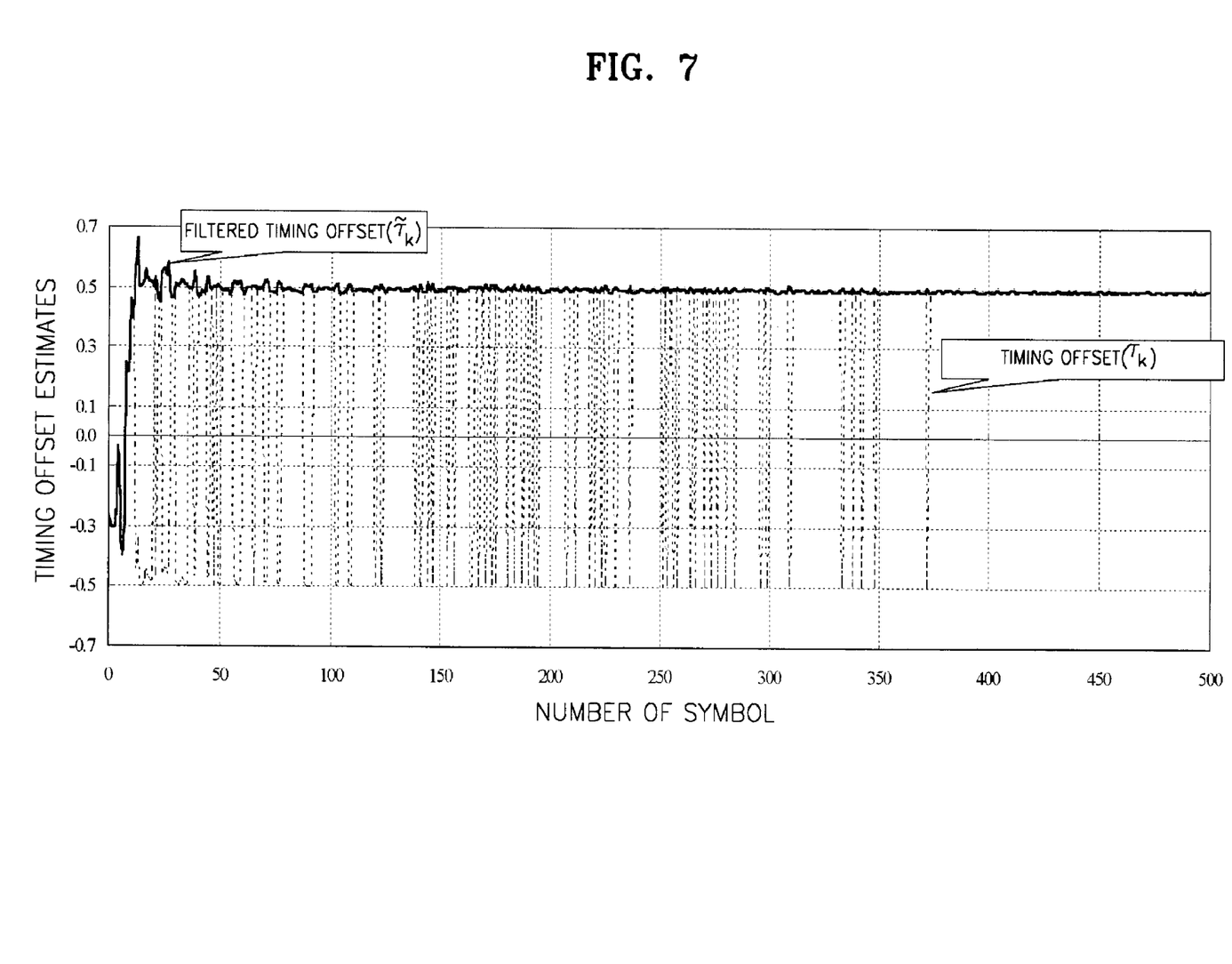
FIG. 7 is a graph showing the input signal (timing offset) and output signal (filtered timing offset) of a post-processor.

FIG. 7 is a graph showing the input signal (timing offset ($\tau_k$)) and output signal (filtered timing offset ($\tilde{\tau}_k$)) of the post-processor 400. The graph shows that the timing offset ($\tau_k$) which oscillates between +0.5 and −0.5 is output as a largely constant value after passing the post-processor 400.

Generally, in implementation, interpolators are classified as either a coefficient real-time calculation type or a coefficient storing type. The interpolator 500 used in the symbol timing recovery circuit 1000 according to a preferred embodiment of the present invention is the coefficient real-time calculation type which has a simple structure and high performance. This type of interpolator calculates a finite impulse response (FIR) filter coefficient in real-time, which is to be used in interpolation, by using the estimated timing offset. Accordingly, a memory for storing an FIR filter coefficient is not needed and a timing estimate value does not need to be quantized so that timing jitter can be reduced.

Interpolators have filter structures based on polynomial expressions. In digital modems, linear, piecewise-parabolic, and cubic types based on a Lagrange formula are commonly used and are implemented mainly using a Farrow structure. The interpolator 500 according to a preferred embodiment of the present invention is implemented as a cubic interpolation type having the Farrow structure. The cubic interpolation method using the Farrow structure is referred to as a Cubic Farrow method and is described in "Interpolation in Digital Modems-Part II: Implementation and Performance", IEEE Trans. Commun., June 1993, the contents of which are incorporated by reference.

The output signal of the interpolator 500 can be expressed by the convolution of an input signal by the FIR filter as follows:

$$y(kTi) = y[(m_k + \tau_k)T_{sa}] = \sum_{j=I_1}^{I_2} x[(m_k - j)T_{sa}]h[(j + \tau_k)T_{sa}] \quad (2)$$

where Ti denotes the output period of the interpolator 500, Tsa denotes the sample cycle, and if the number of samples for a symbol is 4, T(symbol period)=4 Tsa.

One of the characteristics of the interpolator 500 according to a preferred embodiment of the present invention is that an estimated timing offset is divided into an integer timing offset and a fractional timing offset, and compensation is performed separately for the integer timing offset and the fractional timing offset so that timing jitter can be reduced. Since the output signal of the matching filter 120 of FIG. 2, e.g., the input samples ($X(mT_{sa})$), is four samples for one symbol, if a timing offset is multiplied by 4, a timing offset estimate value in units of samples of a receiving terminal can be obtained. Expressed mathematically, $$\text{timing offset} \times 4 = int[\text{timing offset}] + \quad (3)$$
$$(\text{timing offset} - int(\text{timing offset}))$$

-continued
= integer timing offset + fractional timing offset where timing offset is normalized as described above.

Figure 8:
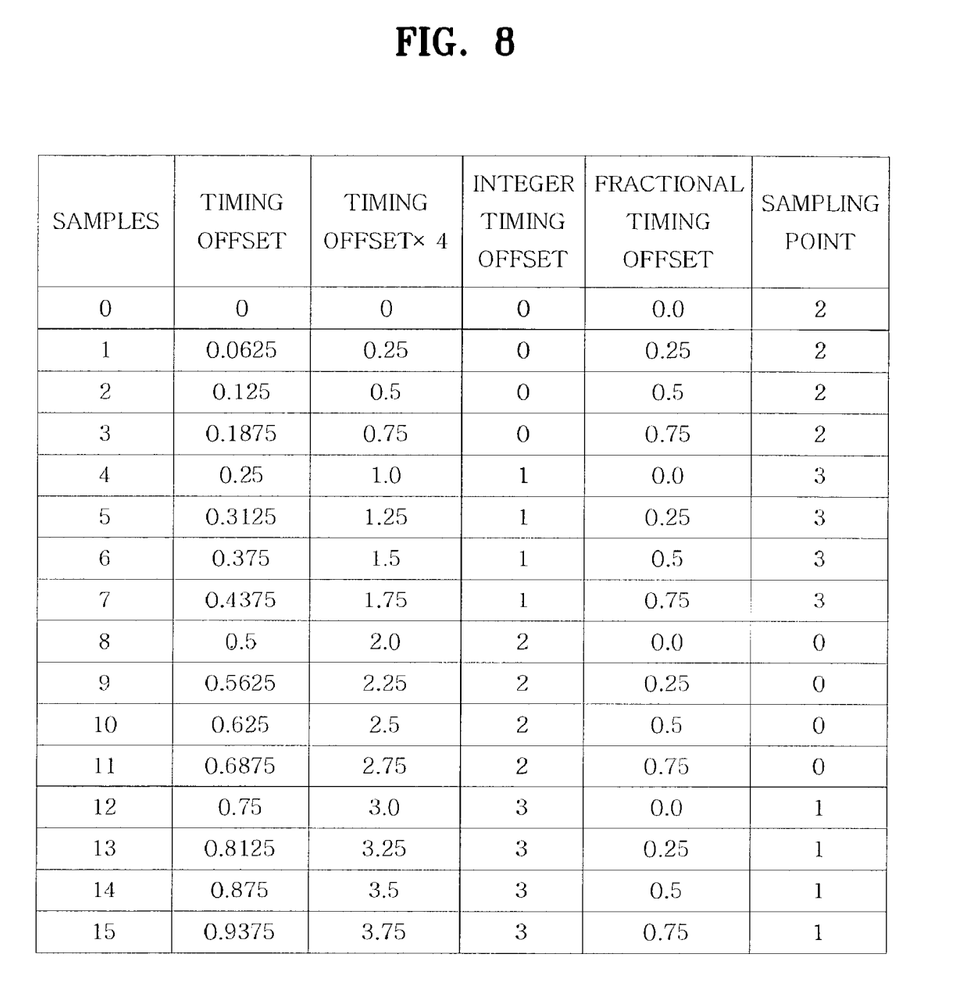
FIG. 8 is a table showing the relationship between integer timing offsets and fractional timing offsets of a variety of timing offsets and sampling points.

FIG. 8 is a table showing the relationship between integer timing offsets and fractional offsets of a variety of timing offsets and sampling points.

Another characteristic of the interpolator 500 according to the present invention is that it solves the problem of a timing offset estimate value constantly increasing or decreasing due to maximum +/−200 ppm clock instability which can occur in a telephone line modem.

Figure 9:
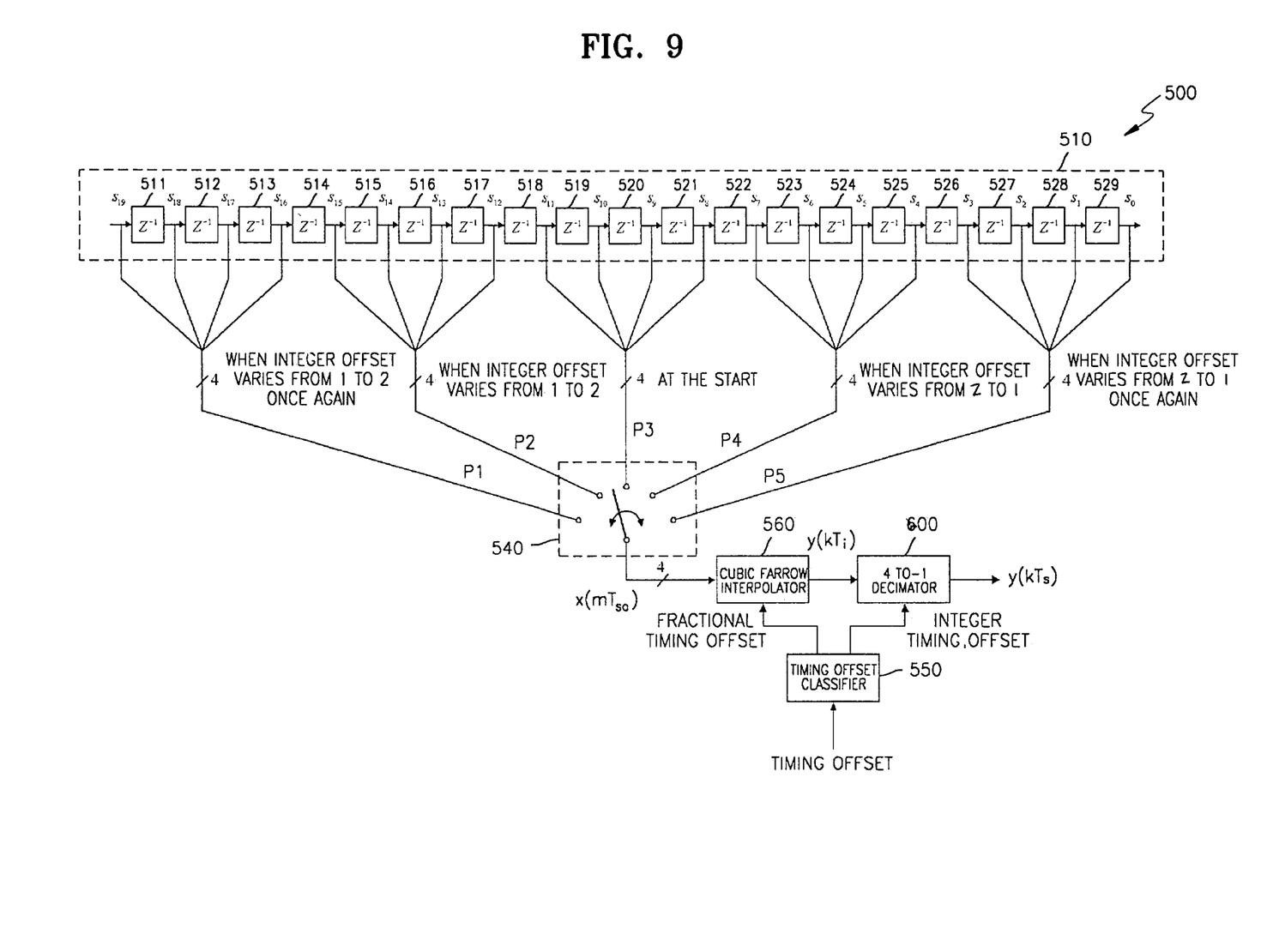
FIG. 9 is a circuit diagram of a preferred embodiment of an interpolator shown in FIG. 2.

FIG. 9 is a circuit diagram showing the interpolator 500 according to a preferred embodiment of the present invention shown in FIG. 2. Referring to FIG. 9, the interpolator 500 comprises a plurality of shift registers 510, a controller 540, a timing offset classifier 550, and a Cubic Farrow interpolator 560. The interpolator 500 may further comprise a decimator 600.

The plurality of shift registers 510, which are serially connected, receive input samples, delay the input samples for an input sample period, and output the samples. By doing so, a series of input samples ($S_0$~$S_{19}$), each having an interval of one input sample period, are output in parallel. That is, the first shift register 511 receives an input sample ($S_{19}$), delays the input sample for one input sample period, and outputs the input sample. The second through 19th shift registers 512 through 529 receive respective samples ($S_{18}$~$S_1$) output from the previous shift registers (the first through 18th shift registers), delay the samples for one input sample cycle, and output the samples.

The controller 540 selects 4 adjacent samples among the input sample ($S_{19}$) of the first shift register 511 and the output samples ($S_{18}$~$S_0$) of the first through 19th shift registers 512 through 529, and provides the selected samples to the Cubic Farrow interpolator 560. In the initial stage, the controller 540 provides four samples at the start location (P3) to the Cubic Farrow interpolator 560. When the integer timing offset varies from 1 to 2, the controller 540 selects four samples immediately preceding the current location by a distance of 4 samples, and provides the selected samples to the Cubic Farrow interpolator 560. When the integer timing offset varies from 2 to 1, the controller 540 selects four samples immediately succeeding the current location by a distance of 4 samples, and provides the selected samples to the Cubic Farrow interpolator 560.

For example, when the current location is the start location (P3), if the integer timing offset varies from 1 to 2, four samples at the location (P2) immediately preceding the start location (P3) by a distance of 4 samples are selected. Subsequently, if the integer timing offset varies once again from 1 to 2, four samples at the location (P1) immediately preceding the location (P2) by a distance of 4 samples are selected. Also, when the current location is the start location (P3), if the integer timing offset varies from 2 to 1, four samples at the location (P4) immediately succeeding the start location (P3) by a distance of 4 samples are selected. Subsequently, if the integer timing offset varies once again from 2 to 1, four samples at the location (P5) immediately succeeding the location (P4) by a distance of 4 samples are selected.

The timing offset classifier 550 divides a value obtained by multiplying a timing offset by 4, into an integer and a fraction, and generates an integer timing offset and a fractional timing offset.

The Cubic Farrow interpolator 560, in response to the fractional timing offset, performs interpolation using the 4 samples selected by the controller 540 and outputs an interpolator output sample (y(kT$_i$)).

The decimator 600, in response to the integer timing offset, performs 4-to-1 decimation of the interpolator output sample (y(kT$_i$)), that is, selects one sample in every 4 samples and outputs the selected sample. The location of a sample selected according to the integer timing offset is the sampling point shown in FIG. 8. Referring to FIG. 8, when the integer timing offsets are 0, 1, 2, and 3, the sampling points are 2, 3, 0, and 1, respectively. Since the number of samples for one symbol is 4, the number of sampling points is also 4. The fact that sampling points are 0, 1, 2, and 3 means that the first, second, third, and fourth samples are respectively selected for the four interpolator output samples (y(kT$_i$)).

Accordingly, the integer timing offset can be compensated for by the decimator 600 selecting an appropriate sample among the interpolator output samples (y(kT$_i$)), while the fractional timing offset can be compensated by using the Cubic Farrow interpolator 560.

The interpolator 500 according to a preferred embodiment of the present invention prevents reiteration or dropping of a symbol due to clock instability. When the integer timing offset varies from 1 to 2 due to clock instability, reiteration of an identical symbol occurs, and when the integer timing offset varies from 2 to 1, dropping of a symbol occurs. For example, since a 10 Mbps-level HomePNA 2.0 system transmits maximum 1,526 bytes, a timing transition of +/−1.2208T may occur by a maximum +/−200 ppm frequency offset. Considering all this, during one frame reception time, both the frequency that the integer timing offset varies from 1 to 2 and the frequency that the integer timing offset varies from 2 to 1 are 2 at maximum. Accordingly, by moving the location of interpolation samples being currently processed forward (to the future) by a distance of 4 samples, the problem of reiteration of an identical symbol occurring when the integer timing offset varies from 1 to 2 is solved. Also, by moving the location of interpolation samples being currently processed, backward (to the past) by a distance of 4 samples, the problem of dropping of a symbol occurring when the integer timing offset varies from 2 to 1 is solved.

The interpolator 500 shown in FIG. 9 performs interpolation using the four samples from the start location (at the start, P3). When the integer timing offset varies from 1 to 2, the interpolator 500 performs interpolation using four samples at the location immediately preceding the current location by a distance of 4 samples, and if the integer timing offset varies once again from 1 to 2, the interpolator 500 performs interpolation using four samples again immediately preceding the current location by a distance of 4 samples. Also, when the integer timing offset varies from 2 to 1, the interpolator 500 performs interpolation using four samples at the location immediately succeeding the current location by a distance of 4 samples, and if the integer timing offset varies once again from 2 to 1, the interpolator 500 performs interpolation using four samples again immediately succeeding the current location by a distance of 4 samples.

As described above, to compensate for the phenomenon of the timing offset monotonously increasing or decreasing due to clock instability, a total of 20 samples, including 8 preceding samples and 8 succeeding samples as well as the 4 samples at the current interpolation location, should be stored. Therefore, it is preferable that the interpolator 500 according to a preferred embodiment of the present invention comprises at least the 19 shift registers 511 through 529.

Optimal embodiments of the present invention have been described above and are shown in the attached drawings. However, the present invention is not limited to the preferred embodiments described above, and it is apparent that variations and modifications can be effected by those skilled in the art within the spirit and scope of the present invention defined in the appended claims.

By employing the timing estimator of the present invention, a symbol timing offset can be stably estimated in a telephone line modem receiver. Also, the interpolator of the present invention is insensitive to clock instability between transmission and reception terminals, and can perform interpolation without dropping or reiteration of a received signal.

Therefore, since the symbol timing recovery circuit comprising the timing estimator and the interpolator of the present invention is not sensitive to clock instability and employs a stable timing offset estimation method, symbol timing can be recovered stably and reliably.

What is claimed is:

1. A symbol timing estimating circuit for estimating a symbol timing offset in a telephone line modem receiver, the symbol timing estimating circuit comprising:
   a timing offset estimating unit for performing an operation on a received sample signal, estimating a timing offset, and outputting the estimated timing offset from a read only memory containing a plurality of timing offset values, wherein the timing offset estimating unit, in response to at least one control signal, estimates the timing offset in units of a predetermined window size, outputs a timing offset estimated for each symbol for a first window interval, and thereafter outputs a timing offset estimated in an immediately previous window interval for a current window interval; and
   a control signal generation unit for generating a reset signal and a hold signal forming the at least one control signal for controlling the operation of the timing offset estimating unit in response to a carrier sense signal indicating whether a received signal is present.

2. The symbol timing estimating circuit of claim 1, wherein the timing offset estimating unit comprises:
   an operator for calculating and outputting a square of the received sample signal;
   a mean estimator for calculating a mean of the output of the operator in units of the predetermined window size, in response to the reset signal forming one of the at least one control signal; and
   a memory unit for maintaining the mean value output from the mean estimator in response to the hold signal forming another of the at least one control signal.

3. The symbol timing estimating circuit of claim 2, wherein the operator processes 4 units of the received sample signal in parallel.

4. The symbol timing estimating circuit of claim 1, wherein the control signal generation unit begins counting from a time when the carrier sense signal is received, activates the reset signal forming one of the at least one control signal whenever the count value is a multiple of the window size, and activates the hold signal forming another of the at least one control signal when the count value is greater than the window size and the reset signal is inactivated.

5. An interpolator circuit for performing interpolation using input samples in a telephone line modem receiver, the interpolator circuit comprising:
- a plurality of shift registers serially connected for outputting the input samples in parallel in groups of a predetermined number of input samples, by sequentially delaying for an input sample period and then outputting the input samples;
- a controller receiving the groups of input signals for selecting four adjacent samples in a location immediately preceding or immediately succeeding a current location from among the groups of input samples in response to an integer timing offset; and
- an interpolator, for performing interpolation on the four adjacent input samples selected by the controller and outputting output samples, in response to a fractional timing offset signal fed thereto.

6. The interpolator circuit of claim 5, wherein the number of the input samples for each symbol is 4.

7. The interpolator circuit of claim 6, wherein the controller selects 4 adjacent input samples immediately preceding the current location by a distance of 4 samples when the integer timing offset varies from 1 to 2, and selects 4 adjacent input samples immediately succeeding the current location by a distance of 4 samples when the integer timing offset varies from 2 to 1.

8. The interpolator circuit of claim 6, wherein the plurality of shift registers includes 19 shift registers.

9. The interpolator circuit of claim 6, further comprising:
a decimator for performing 4 to 1 decimation of the output samples.

10. The interpolator circuit of claim 6, further comprising:
a timing offset classifier for dividing a product obtained by multiplying a predetermined timing offset by 4, into an integer and a fraction, and outputting the integer timing offset and the fractional timing offset.

11. A symbol timing recovery circuit for recovering a symbol timing in a telephone line modem receiver, the symbol timing recovery circuit comprising:
- a timing estimator for performing an operation on input samples and estimating a timing offset of a received symbol, wherein the timing estimator outputs a timing offset estimated for each symbol for a first window interval, and thereafter outputs a timing offset estimated in an inunediately previous window interval for a current window interval; and
- an interpolator for performing interpolation using the input samples, wherein the interpolator comprises:
- a plurality of shift registers serially connected for outputting the input samples in parallel in groups of a predetermined number of input samples, by sequentially delaying for an input sample period and then outputting the input samples;
- a control unit receiving the groups of input signals for selecting four adjacent samples in a location immediately preceding or immediately succeeding a current location from among the groups of input samples in response to an integer timing offset; and
- an interpolation unit for performing interpolation on the groups of input samples selected by the control unit and outputting output samples, in response to a fractional timing offset.

12. The symbol timing recovery circuit of claim 11, wherein the timing estimator comprises:
- a timing offset estimating unit for estimating the timing offset in units of a predetermined window size in response to at least one control signal; and
- a control signal generation unit for generating the at least one control signal for controlling the operation of the timing offset estimating unit in response to a carrier sense signal indicating whether a received signal is present.

13. The symbol timing recovery circuit of claim 12, wherein the timing offset estimating unit comprises:
- an operator for calculating and outputting a square of the input samples;
- a mean estimator for calculating a mean of the output of the operator in units of the window size, in response to a reset signal forming one of the at least one control signal; and
- a memory unit for maintaining the mean value output from the mean estimator in response to a hold signal forming another of the at least one control signal.

14. The symbol timing recovery circuit of claim 12, wherein the control signal generation unit begins counting from a time when the carrier sense signal occurs, activates a reset signal forming one of the at least one control signal whenever the count value is a multiple of the window size, and activates a hold signal forming another of the at least one control signal when the count value is greater than the window size and the reset signal is inactivated.

15. The symbol timing recovery circuit of claim 11, wherein the number of the input samples for each symbol is 4.

16. The symbol timing recovery circuit of claim 15, wherein the control unit selects 4 adjacent input samples in the location immediately preceding a current location by a distance of 4 samples when the integer timing offset varies from 1 to 2, and selects 4 adjacent input samples in the location immediately succeeding the current location by a distance of 4 samples when the integer timing offset varies from 2 to 1.

17. The symbol timing recovery circuit of claim 15, wherein the plurality of shift registers includes 19 shift registers.

18. The symbol timing recovery circuit of claim 15, wherein the interpolator further comprises:
a decimator for performing 4 to 1 decimation of the output samples.

19. The symbol timing recovery circuit of claim 15, wherein the interpolator further comprises:
a timing offset classifier for dividing a product obtained by multiplying a predetermined timing offset by 4, into an integer and a fraction, and outputting the integer timing offset and the fractional timing offset.

* * * * *